J. D. PRINCE.
LAMINATED FABRIC FOR SHOE SOLES AND THE LIKE.
APPLICATION FILED MAR. 17, 1915.

1,208,209.  Patented Dec. 12, 1916.

Witnesses:-
Hyperion Barry.
J. George Barry.

Inventor:
John D. Prince
by his attorneys
Brown Sward

UNITED STATES PATENT OFFICE.

JOHN D. PRINCE, OF BOSTON, MASSACHUSETTS.

LAMINATED FABRIC FOR SHOE-SOLES AND THE LIKE.

1,208,209.

Specification of Letters Patent. Patented Dec. 12, 1916.

Application filed March 17, 1915. Serial No. 14,918.

*To all whom it may concern:*

Be it known that I, JOHN D. PRINCE, a citizen of the United States, and resident of Boston, in the county of Suffolk and State of Massachusetts, have invented a new and useful Improvement in Laminated Fabric for Shoe-Soles and the like, of which the following is a specification.

This invention relates to a laminated fabric or structure designed particularly for use as shoe soles and the like, together with a method of making the same.

The objects are to provide a material for shoe soles which can be used in place of rubber soles, having all the desirable qualities of the latter, while, at the same time, having much greater strength and wear-resisting properties; avoiding the tendency of rubber soles to crack, particularly across the ball of the foot; and making provision for firm attachment to the remainder of the shoe by means of the customary sewing; as well as other advantages which inhere in the structure.

The invention comprises, broadly, a plurality of layers of rubber, preferably two, and an intermediate layer of leather; the whole being so compounded, treated and united as to obtain the desirable features above enumerated.

A practical embodiment of the fabric or structure which is the subject matter of this invention, is represented in the accompanying drawings, in which—

Figure 1:
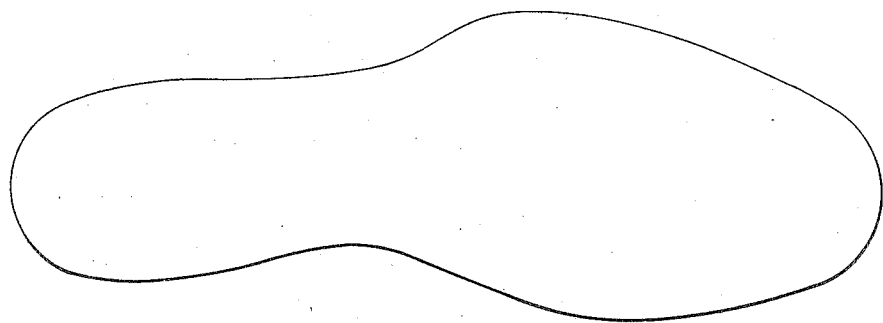
Figure 2:
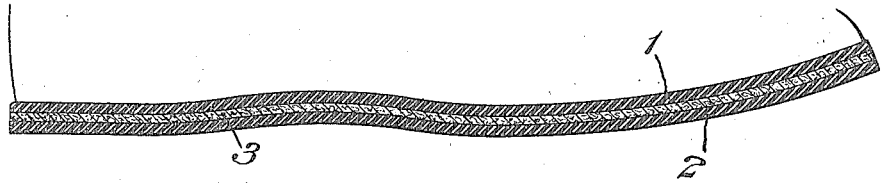

Figure 1 represents a bottom plan of a shoe sole, and Fig. 2 a longitudinal section therethrough.

The rubber layers are denoted by 1, 2, and the intermediate leather layer by 3.

In producing this laminated structure, I take some rubber which has been compounded for purposes of vulcanization, and calender the same into strips of the desired thickness. The quality of the rubber compound may, of course, be varied; but I find it perfectly feasible to use a relatively cheap compound with eminently satisfactory results. After the rubber compound has been thus calendered, it is placed between the well known platens of a vulcanizing press and cured or vulcanized, in a manner well understood in the art. It is advantageous to place something rough against one side of the rubber layer while it is being vulcanized, in order to provide a roughened surface for the vulcanized rubber, which is desirable for the application of cement in the subsequent steps of the process. I have found a strip of cloth, such as muslin, interposed between one of the platens of the vulcanizer and the layer of rubber, to be satisfactory for this purpose. I next provide a layer or sheet of leather, and prefer to use what is known in the art as a "soft split", viz: that portion of the hide which is next to the grain and from which the grain has been removed. This split or layer of leather may then be run through a splitting machine of well known or approved form, in order to remove the so-called "flesh" portion and to render the leather of a uniform thickness, as well as of the thickness desired for the purpose of this invention. Preferably the sheet or layer of leather as thus split is slightly less than the thickness of the layers of rubber compound heretofore referred to. The next step is to coat both sides of the leather, and the roughened sides of the rubber sheets, with cement; and I preferably use the well known rubber cement. These coatings of cement are allowed to dry or become "tacky", and several coats of cement may be applied if desired. The cement will dry in a period of say about one-half to two hours, at normal temperatures, according to the atmospheric conditions and the number of coatings applied. When the cement has dried, the two layers of rubber and the layer of leather are associated, with the cemented sides contiguous and the leather intermediate the rubber layers. The whole is then thoroughly rolled, for instance with a hand roller, in order to provide a thorough contact of the surfaces and remove any excess of air which may exist between the layers.

After the rolling operation, the assembly is submitted to a series of blows, which may be delivered by a wooden mallet or by strokes applied to a piece of wood held against the structure, or in any other feasible manner. These blows are preferably applied locally, *i. e.*, so as not to cover the whole surface of the laminated structure being treated at each blow. I have found that this method of forcing the layers firmly together is preferable to that of a press which covers the whole surface; and I attribute this result to the apparent fact that the local impact causes a firmer union of the area subjected to it, inasmuch as it has no tendency to bridge over slight unevenness in the surface (which is a characteristic of a press covering the whole surface); and to the further fact that the local blows do not have the tendency to draw the cement away from any parts of the contiguous surfaces. At any rate, this method of applying the layers to each other, produces a remarkable adhesion, and one which is actually far superior to that produced by submitting the whole to a pressure. I find that any moisture which may remain in the cement after the treatment just described, is absorbed by the material, apparently due to the slight porosity of the rubber; and this apparently results in producing a myriad of infinitesimal vacuum cups or cells which mechanically assist to a great extent in the adhesion of the layers. The fabric as thus completed may be shaped in the ordinary manner for use as shoe soles and the like, and may be sewed to the remainder of the shoe in a well understood manner. This sewing is much more effective with my invention than the ordinary rubber sole, owing to the fact that the locks of the stitches engage the layer of leather and thereby prevent tearing out of the stitches, which is not infrequent in rubber soles.

I have found, in tests, that the outer layer of rubber 2 will wear as long as the ordinary rubber sole, although the latter is of much greater thickness than the former, and that the sole as a whole is very much stronger than the ordinary rubber sole, owing to the presence of the layer of leather, which has about four times the tensile strength of a rubber sole of the combined thickness of the three layers incorporated in my structure. Furthermore, the leather retains great resiliency owing to the process by which it is made, which avoids any drying or hardening of the leather; and this assists the remarkable cushioning effect which is obtained from this structure when in use. After the outer layer of rubber has been worn off, the layer of leather has a wearing resistance equal to that of an entire rubber sole; which is doubtless due to the fact that it is cushioned by the inner layer of rubber 1. After the leather has been worn through, there still remains the inner layer of rubber to provide considerable wearing surface.

The structure as a whole provides a very strong, elastic and wear-resisting sole which will not tear away from the remainder of the shoe and will not crack, as is the case with rubber soles.

The process or method by which this structure is obtained as described above, is very cheap and simple, and may be conducted without the provision of special machinery.

It will be understood that various changes may be resorted to in the materials, compositions and steps of the process without departing from the spirit and scope of my invention; and hence I do not intend to be limited to the specific details set forth except as they may be included in the claims.

What I claim is:—

1. A fabric for shoe soles and the like comprising a plurality of layers of rubber and an intermediate layer of leather, the whole being firmly bonded into a unitary structure.

2. A fabric for shoe soles and the like comprising a plurality of layers of vulcanized rubber and an intermediate layer of leather, the whole being firmly bonded into a unitary structure.

3. A fabric for shoe soles and the like comprising a plurality of layers of rubber and an intermediate layer of leather, the contiguous surfaces of the rubber and leather being cemented and the whole firmly bonded into a unitary structure.

4. The method of making a fabric for shoe soles and the like, which fabric includes layers of rubber and leather, comprising, first, coating a surface of the layers with cement; second, associating the layers with the cement intermediate thereof; and, third, subjecting the whole to impact blows.

5. The method of making a fabric for shoe soles and the like, which fabric includes layers of rubber and a layer of leather, comprising, first, coating both surfaces of the leather and one surface of each of the layers of rubber with cement; second, associating the layers with the leather between the rubber and the cemented surfaces contiguous; and, third, subjecting the whole to impact blows.

6. The method of making a fabric for shoe soles and the like, which fabric includes layers of rubber and a layer of leather, comprising, first, coating both surfaces of the leather and one surface of each of the layers of rubber with cement; second, associating the layers with the leather between the rubber and the cemented surfaces contiguous; third, applying a rolling pressure to the associated layers; and, fourth, subjecting the whole to impact blows.

7. The method of making a fabric for shoe soles and the like, which fabric includes layers of rubber and leather, comprising, first, coating a surface of the layers with cement; second, associating the layers with the cement intermediate thereof; and, third, subjecting the whole to impact blows locally applied.

8. The method of making a fabric for shoe soles and the like, which fabric includes layers of rubber and a layer of leather, comprising, first, coating both surfaces of the leather and one surface of each of the layers of rubber with cement; second, associating the layers with the leather between the rubber and the cemented surfaces contiguous; and, third, subjecting the whole to impact blows locally applied.

9. The method of making a fabric for shoe soles and the like, which fabric includes layers of rubber and a layer of leather, comprising, first, coating both surfaces of the leather and one surface of each of the layers of rubber with cement; second, associating the layers with the leather between the rubber and the cemented surfaces contiguous; third, applying a rolling pressure to the associated layers; and, fourth, subjecting the whole to impact blows locally applied.

10. The method of making a fabric for shoe soles and the like, which fabric includes layers of vulcanized rubber and leather, comprising, first, coating a surface of the layers with cement; second, associating the layers with the cement intermediate thereof; and, third, subjecting the whole to impact blows locally applied.

11. The method of making a fabric for shoe soles and the like, which fabric includes layers of vulcanized rubber and a layer of leather, comprising, first, coating both surfaces of the leather and one surface of each of the layers of rubber with cement; second, associating the layers with the leather between the rubber and the cemented surfaces contiguous; and, third, subjecting the whole to impact blows locally applied.

12. The method of making a fabric for shoe soles and the like, which fabric includes layers of vulcanized rubber and a layer of leather, comprising, first, coating both surfaces of the leather and one surface of each of the layers of rubber with cement; second, associating the layers with the leather between the rubber and the cemented surfaces contiguous; third, applying a rolling pressure to the associated layers; and, fourth, subjecting the whole to impact blows locally applied.

13. The method of making a fabric for shoe soles and the like, which fabric includes layers of vulcanized rubber and a layer of leather, comprising, first, roughening one surface of each layer of rubber and both surfaces of the leather; second, coating the roughened surfaces of rubber and leather with cement; third, allowing the cement to dry; fourth, associating the layers of rubber and leather with the leather between the rubber and the cemented surfaces contiguous; fifth, applying a rolling pressure to the assembled layers; and, sixth, subjecting the whole to impact blows locally applied.

In testimony, that I claim the foregoing as my invention, I have signed my name in presence of two witnesses, this 12th day of March, 1915.

JOHN D. PRINCE.

Witnesses:
HENRY C. THIEME,
C. L. LUNDGREN.